Nov. 28, 1961 R. W. KETCHLEDGE 3,010,655
SIGNAL COMPARISON SYSTEM
Filed Dec. 3, 1957
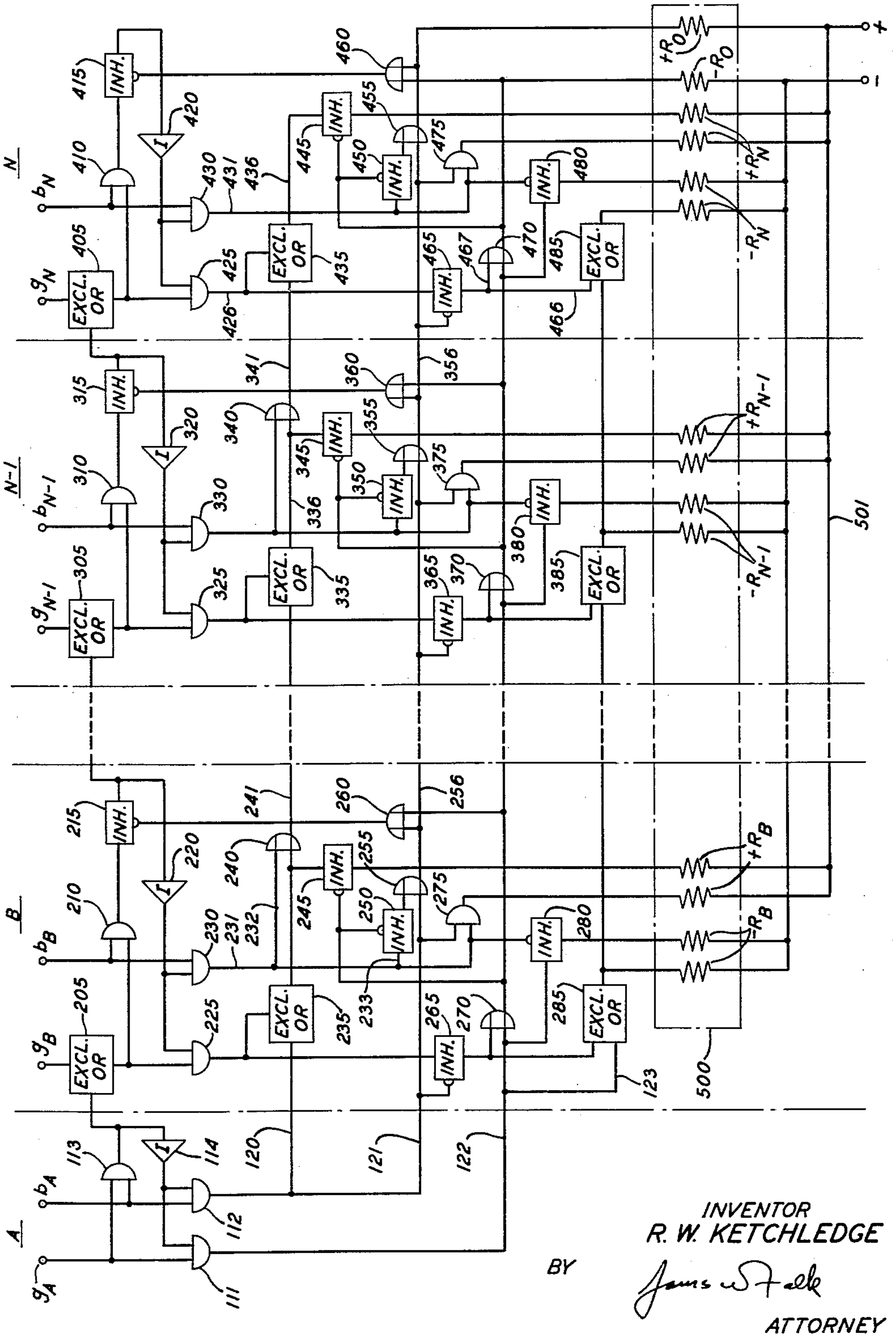
INVENTOR
R. W. KETCHLEDGE
BY James W. Falk
ATTORNEY 3,010,655
Patented Nov. 28, 1961

3,010,655
SIGNAL COMPARISON SYSTEM

Raymond W. Ketchledge, Whippany, N.J., assignor to Bell Telephone Laboratories, Incorporated, New York, N.Y., a corporation of New York Filed Dec. 3, 1957, Ser. No. 700,373
12 Claims. (Cl. 235—177)

This invention relates to electrical signal comparison systems and more particularly to a system for comparing binary numbers.

One of the operations which electronic information handling devices often are called upon to perform is the rapid and accurate detection of the difference between two numbers which may represent two distinct information items handled by the devices. For example, high speed cathode ray tube information storage systems are feasible only if the rapid and accurate positioning of an electron beam on a storage target can be obtained in accordance with directive information fed to the beam deflection system. A binary number comparison system assures the requisite speed and accuracy. Binary numbers form the input directive information and each position on the storage target impinged by the beam forms a discrete output binary number. Comparison of input and output numbers yields a difference signal which advantageously may be utilized to reposition the beam to the position dictated by the input information.

The binary number forms utilized in such comparison systems and favored in most electronic information handling devices are those permitting alternate representations of each digit; viz., a binary code in which a code group consists of a numerical sequence of any number of 0's or 1's in any permutation arrangement.

In accordance with my invention, a binary number comparison system is disclosed which satisfies the high speed servo correction demands of such a storage device application. The system receives all of the digits of two multidigit binary numbers simultaneously, compares corresponding digits under the control of more significant or higher ordered digits and provides alternative outputs, each indicative of the exact magnitude and sign of the difference between the compared numbers.

It is an object of this invention to provide a high speed binary number comparison system.

It is another object of this invention to compare two binary numbers so as to provide an indication of their relative magnitudes or sign and the exact magnitude of their difference.

The above objects are attained in accordance with an illustrative embodiment of the invention by the application to a comparator network of each of the various digits of a first binary code number as one of two electrical signals, each digit being alloted a distinct input in one of several comparison positions of the comparator network. Each of the various digits of a second binary code number to be compared with the first binary code number is applied as one of two electrical signals to another input in the same position as the signal for the digit of corresponding significance or like order in the former number. Thus, each pair of digits of corresponding significance in the compared numbers is applied to a distinct position or stage in the comparator. Advantageously, all digits are applied at their respective inputs simultaneously. A plurality of weighting elements are associated with the comparison circuitry in each position and are coupled to a distinct one of alternative common outputs which yields the relative magnitude or sign and the exact difference in magnitude of the compared binary code numbers.

Binary number comparison systems of this type are disclosed in my applications, Serial No. 685,688 and Serial No. 651,897, now Patent No. 2,923,475, filed September 23, 1957, and April 10, 1957, respectively. The former application is directed in part to the broad aspects of comparison systems which derive the magnitude and sign of the difference between two input numbers applied to the comparator in binary code form. The latter application also is concerned with deriving the exact magnitude and sign of the difference between the compared numbers and achieves greater accuracy and reliability by utilizing distinct digit comparison resultants to control such resultants from more or from less significant digit comparisons.

The instant system achieves comparable results utilizing a unique approach to the logic of the problem. This approach is implemented by a novel network arrangement characterized by a series of four possible control signals from each digit comparison which are carried to and control output signals from less significant or lower ordered digit positions.

In accordance with my invention, binary digit comparisons are conducted simultaneously in each position to determine the presence in each position of a digit match or mismatch. Each position is arranged to provide a comparison resultant indicative of this match or mismatch condition which resultant may initiate two of the four possible control signals carried to less significant digit positions. After proper weighting of each comparison resultant in accordance with its individual position significance or order in the compared numbers and dependent upon comparison resultants in more significant or higher ordered digit comparison positions as reflected by the "carry" control signals, a summation of the resultants yields the sign and exact magnitude of the difference between the numbers in a rapid, accurate and reliable manner.

The network may be adapted for comparisons of various binary code forms. In this instance two distinct binary code forms are employed which are popularly referred to as the conventional binary code and the reflected binary code, the latter being derived from the former in a manner disclosed in the patent of F. Gray, No. 2,632,058, issued March 17, 1953.

The following example of simple subtraction in which the decimal number 26 (10111 in reflected binary code form) is subtracted from the decimal number 37 (100101 in conventional binary code form) will illustrate the operation of the comparison system in accordance with my invention.

| | | | | | | | | |
|---|---|---|---|---|---|---|---|---|
| | Weighting | 32 | 16 | 8 | 4 | 2 | 1 | |
| | Position | A | B | C | D | E | F | |
| 37 (dec.) | Minuend (conventional binary) | 1 | 0 | 0 | 1 | 0 | 1 | |
| 26 (dec.) | Subtrahend (reflected binary) | 0 | 1 | 0 | 1 | 1 | 1 | |
| | Comparison resultant | $+x$ | | | | | | |
| 11 | Weighted resultant | | 0 | 0 | 2(+4) | 0 | 2(+1) | +1=11 |

Each digit position A–F in the binary numbers is assigned a binary weighting corresponding to the significance or order of the digit position in the number. Thus the most significant digit position A, in this example, is assigned a weighting of 32 corresponding to the significance ($2^5$) of that digit position in a six digit conventional binary code number. In accordance with the logic of this comparison system, the most significant digit comparison producing a mismatch will develop two "carries," determined by the polarity of the mismatch, which "carries" control the outputs of less significant digit positions.

The system in accordance with this invention makes use of an equivalent way of expressing binary digits, e.g., a binary digit "one" represents the weighting assigned its own position, or alternatively, it represents a summation of weightings assigned to all less significant digit positions plus an added unit weighting. Thus in the example, the digit "one" in position A of the minuend represents 32, the weighting of position A, or 16+8+4+2+1+1, the summation of weightings assigned all less significant digit positions plus one. It is equivalent to expressing the number 100000, or 32 in conventional binary code form, as 011111+1. In the conventional binary code, of course, the value of succeeding less significant digit "ones" adds to the value of the most significant digit "one" to provide the value of the number. In the reflected binary code, the value of any digit may be expressed as the weighting of its own and all following digit positions, or alternatively, as twice the weighting of all less significant digit positions plus an added unit weighting. Thus in the example the digit "one" in position B of the subtrahend represents 16+8+4+2+1=31 or 2(8)+2(4)+2(2)+2(1)+1. A less significant digit "one" in the reflected binary code number is valued in a similar manner but takes the sign opposite the preceding digit "one." Thus in the subtrahend of the example, the digit "one" in position D represents $$-2(2)-2(1)-1=-7$$

that in position E represents +3, and that in position F represents −1.

Utilizing these alternative means for expressing digit values in each code, the system in accordance with the invention identifies the positive mismatch in position A of this example by initiating two positive "carry" signals which seek to provide outputs in this polarity in each less significant digit position plus an added output with unit weighting, the summation of which outputs will reflect the magnitude and sign of the difference between the compared numbers. One of the "carries" assures that all outputs have the desired sign, in this instance positive, by preventing initiation of negative "carries" in less significant digit positions.

It is evident at this point that the circuit is informed by the most significant digit mismatch that a difference exists between the compared numbers, but it remains for succeeding digits to determine whether this difference is maximum, minimum or intermediate. The maximum positive difference between the compared numbers with this initial mismatch would exist if the minuend was 63 or 111111 in conventional binary code form and the subtrahend was 0 or 000000 in reflected binary code form. In this event the two positive "carries" initiated in position A would provide two distinct positive outputs in each digit position B–F plus the additional unit output for a final resultant of $$2(16)+2(8)+2(4)+2(2)+2(1)+1=+63$$

The appearance of "zeros" in the minuend and "ones" in the subtrahend may be seen to reduce this maximum difference resultant, the ultimate minimum difference resultant with a positive mismatch in position A being achieved when the minuend is 32 or 100000 in conventional binary code form and the subtrahend is 31 or 010000 in reflected binary code form. In this event the "zeros" in positons B–F of the minuend would prevent one of the "carries" from producing its output in each of these positions, and the "one" in position B of the subtrahend would prevent the other "carry" from producing its output in that and all less significant digit positions. The only output not inhibited in this instance is the added output with unit weighting, thus providing the correct final resultant of +1.

Thus in the instant example, the "zeros" in positions B, C and E of the minuend reduce the final resultant from the possible maximum by preventing one of the "carries" from producing its output in each of these positions. Similarly the "one" in position B of the subtrahend increases the size of the subtrahend, in turn tending to decrease the final difference resultant. To effect this result, the "one" in position B prevents the other positive "carry" from producing its output in this position and all less significant digit positions. The "one" in position D of the subtrahend renews the chain of outputs controlled by this carry in position D and all less significant digit positions. Succeeding "ones" in positions E and F stop and restart the carry output control respectively.

In review, the most significant digit mismatch, occurring in this example in position A, initiates two positive carries for production of two positive outputs in each less significant digit position plus an additional unit output. The condition of the digits in positions B, C and E of each number is such as to block both outputs in these positions. In positions D and F, however, the condition of the digits in each number is such as to permit both positive "carries" to produce weighted outputs corresponding to the weighting assigned these positions, or 2(+4) and 2(+1) respectively. One positive "carry" extends beyond the position F and produces the unit weighting, +1, output which adds to the outputs of positions D and F to produce the desired resultant +11. Once started, one of the "carries" cannot be stopped, and it will at least produce the unit weighting. This assures that a mismatch, required to start a carry and being indicative of a finite difference in the compared numbers, will produce at least a unit weight resultant.

It is evident therefore, that the comparator, in accordance with this invention, determines the most significant digit mismatch, initiates two "carries" which seek to provide outputs from each less significant digit position which will reflect the maximum possible difference between the compared numbers having this initial mismatch, and minimizes these "carry" controlled outputs in accordance with the particular digits present in each less significant digit position.

In the illustrative embodiment of this invention, each position or stage of the comparator comprises a series of logic circuits including AND, OR, EXCLUSIVE OR, INHIBIT and INVERTER circuits as known in the art and disclosed, for example, in my aforementioned applications. Generally, a logical AND circuit or gate has a plurality of inputs and a single output and is so designed that an output signal is obtained only when like signals of a predetermined type are received simultaneously on each of the inputs. A logical OR gate is basically a circuit having a plurality of inputs and a single output and is designed to produce an output signal when signals of a predetermined type are received at one or more inputs. An EXCLUSIVE OR circuit has a pair of inputs and a single output and combines logic elements in a manner to produce one type of output signal when opposite types of input signals are received and to produce the other type of output signal when input signals of the same type are received. The INHIBIT circuit provides an output signal when a signal of a predetermined type is received at one input and not at another, inhibit, input. The INVERTER provides an output signal of one type upon receipt of an input signal of the opposite type.

It is a feature of this invention that digit comparisons be conducted simultaneously in distinct logic circuits, each circuit being arranged to provide a plurality of control signals selected from more than two possible control signals to logic circuits comparing less significant digits upon the occurrence of a digit mismatch, the control signals serving to determine the single or double weighting and sign of output signals from the less significant digit positions.

A complete understanding of this invention and of this and various other features thereof may be gained from consideration of the following detailed description and the accompanying drawing, the single figure of which is a schematic representation of one embodiment of this invention.

Referring now to the drawing, one embodiment of this invention is shown in which digits of a conventional binary code number $b_A b_B b_{N-1} b_N$, representing the minuend of the comparison and a reflected binary code number $g_A g_B g_{N-1} g_N$, representing the subtrahend of the comparison, are applied simultaneously to the comparison circuit comprising positions A–N.

The compared binary code numbers are not limited to the four-digit length illustrated but may comprise any number of digits. For each additional pair of digits of corresponding significance in the compared numbers, circuitry such as that in position B is added to the comparator. Each position A–N receives a pair of digits, each digit having like significance in the compared numbers. Thus, position A, the most significant digit comparison position, receives the digits $b_A$ and $g_A$, the most significant digit in each of the compared numbers.

Each digit is applied as a selected one of two discrete voltage levels on the corresponding input leads. The two discrete voltage levels represent the binary digits "1" and "0" and the explanation hereinafter will allude to the condition of the circuit in terms of the presence of a "1" or a "0."

The comparisons conducted in each position A–N will yield an indication of a match, positive mismatch or negative mismatch between the compared digits. A match will be indicated if the compared digits are alike; i.e., both "1" or both "0." If the digit of the minuend is a "1" and the digit of the subtrahend is a "0" a positive mismatch will be indicated and for the reverse situation, a negative mismatch will be indicated.

Each position A–N comprises a comparison portion and a control portion, and positions B–N also comprise output means having a weighting portion. The comparison portion of the most significant digit position A advantageously comprises three AND gates 111, 112 and 113 and an inverter circuit 114. The comparison portion in all less significant digit positions also includes an inhibit circuit and an exclusive OR circuit, such as 215 and 205, respectively, in position B.

The control portion of position A includes merely the carry leads while the control portion of each position other than position A comprises one AND gate, four OR gates, four inhibit circuits, and two exclusive OR circuits. Each AND gate is shown as a clear semicircle, and the OR gates, such as 255 in position B, are shown as a semicircle traversed by the input leads.

The weighting portion comprises elements of an analogue converter 500. Four distinct elements are associated with each position other than the most significant digit position and impart a weighting to signals received from the control portion of the comparator equivalent to the weighting assigned the corresponding digit position. Thus, position B in the four-digit comparator illustrated has a binary weighting of 4, and each of the elements $-R_B$ and $+R_B$ will impart a corresponding weighting of 4 to signals received from the control portion of position B. Two additional unit weighting elements $-R_O$ and $+R_O$ are connected to leads emanating from the control portion of position N.

A comparison of two binary numbers will serve to demonstrate the operation of the circuit. Assume that the number 13 is to be compared with the number 9, the former being the reference number or minuend. Table I illustrates the elements of the problem:

I

| | | A | B | N−1 | N | |
|---|---|---|---|---|---|---|
| | Weighting | 8 | 4 | 2 | 1 | |
| | Position | A | B | $N-1$ | N | |
| 13 (dec.) | $b_A b_B b_{N-1} b_N$ (conv. binary) | 1 | 1 | 0 | 1 | |
| 9 (dec.) | $g_A g_B g_{N-1} g_N$ (refl. binary) | 1 | 1 | 0 | 1 | |
| — | Comparison resultant | | $+x$ | | | |
| +4 | Weighted resultant | | | +2 | +1 | +1=+4 |

The correct resultant is +4. Thus, the circuit must provide a plus sign or relative magnitude output signal and a difference magnitude output signal having a binary weighting of 4.

It is noted that in this instance the compared numbers reveal a series of matches, so that comparison resultants of "zero" normally would be obtained in each digit position. Such resultants, of course, cannot produce the desired final resultant of +4, so that additional circuitry is provided to assure that a mismatch occurs, with a consequent comparison resultant. The circuitry utilized in this embodiment reverses a digit of the reflected binary code input to one position when the next more significant digit position receives a "one" at each of its inputs. Thus, in the example illustrated in Table I, the digit match in position A will result in a reversal of the reflected binary code digit $g_B$ in position B. The resultant positive mismatch in position B provides an output which activates two positive "carry" leads, signals on which serve to control outputs in less significant digit positions so as to provide the desired weighted resultant of +4.

The detailed operation of each position in the circuit with the various outputs provided by the example of Table I will now be considered. Position A receives the most significant digits $b_A$ and $g_A$ of the two input numbers. In this instance a "one" appears on each of the input leads, so that comparison AND gate 111 receives a "one" from input $g_A$ and comparison AND gate 112 receives a "one" from input $b_A$. AND gate 113 receives "ones" on each of its input leads and provides an output "one" to inverter 114 and exclusive OR circuit 205. Inverter 114 thus provides a "zero" output which is received at a second input to each of comparison AND gates 111 and 112, so that an output "one" signal fails to appear on any of the "carry" leads 120, 121, 122 and 123 connected to position B.

Position B receives the next most significant digits $b_B$ and $g_B$ of the two input numbers. Again, a "one" appears on each of the input leads but in this instance the "one" at input $g_B$ is inverted by exclusive OR circuit 205 upon receipt of the "one" signal from AND gate 113 in position A. As described hereinbefore, an exclusive OR circuit will provide an output "one" upon receipt of unlike inputs and will provide an output "zero" upon receipt of like inputs. Exclusive OR circuit 205 receives like inputs in this instance, so that an output "zero" results. AND gate 210 receives the "zero" from exclusive OR circuit 205 and the "one" input of $b_B$ and fails to operate. Inverter 220, lacking a "one" input from AND gate 210; i.e., receiving a "zero" input, provides a "one" output to comparison AND gates 225 and 230. Comparison AND gate 230 thus receives two "one" inputs and provides a "one" output on lead 231. This comparison circuit output "one" signal is transmitted over lead 232 and through control OR gate 240 to "carry" lead 241 and over lead 233 through inhibit circuit 250 and control OR gate 255 to "carry" lead 256. The "one" signal on comparison circuit output lead 231 provides one input for control AND gate 275 and provides the inhibit input for inhibit circuit 280. As the "carry" leads 120—123 from position A each have a "zero" signal thereon, no outputs are provided from position B, but "one" signals are now present on the carry leads 241 and 256 for control of comparison outputs in position $N-1$.

Comparison AND gates 325 and 330 in position $N-1$ receive the "zero" inputs from $g_{N-1}$ and $b_{N-1}$ and fail to provide "one" outputs. Thus, exclusive OR circuit 335, receiving a "one" from "carry" lead 241 and a "zero" from comparison AND gate 325, provides a "one" output on lead 336 which is transmitted through control OR gate 340 to "carry" lead 341 and through inhibit circuit 345 to a $+R_{N-1}$ element of analogue converter 500, which imparts a binary weighting of +2 to this signal and passes it to positive output lead 501. The "one" signal on "carry" lead 256 from position B is transmitted through control OR gate 355 in position $N-1$ to carry lead 356. Thus, position $N-1$ provides a single positive output weighted according to its positional weighting and a "one" signal on each of "carry" leads 341 and 356 to position N.

Position N receives "one" signals at each of its $g_N$ and $b_N$ inputs. Exclusive OR circuit 405, receiving a "zero" from position $N-1$ and a "one" from input $g_N$, provides a "one" output to comparison AND gate 425 and to AND gate 410. AND gate 410 receiving "ones" from exclusive OR circuit 405 and input $b_N$ provides a "one" output to inhibit circuit 415. In this instance the "one" signal is inhibited by the "one" signal on "carry" lead 356 from position $N-1$ through control OR gate 460 to the inhibit input of inhibit circuit 415. The consequent output "zero" signal of inhibit circuit 415 is inverted in inverter 420 to provide "one" signals at inputs of comparison AND gates 425 and 430. With "one" signals at each of their respective inputs, comparison AND gates 425 and 430 provide "one" output signals on leads 426 and 431, respectively. The "one" signal on lead 426, together with the "one" signal on "carry" lead 341 from position $N-1$, activates exclusive OR circuit 435 to provide a "zero" signal on output lead 436. The "one" signal on "carry" lead 356 from position $N-1$ is received at the inhibit input of inhibit circuit 465 and serves to block the "one" signal on lead 426, so that a "zero" signal appears on leads 466 and 467 to prevent negative output signals.

The "one" signal from comparison AND gate 430 on lead 431 is transmitted by inhibit circuit 450 and OR gate 455 to the $+R_O$ section of analogue converter 500. The "one" signal on lead 431 from comparison AND gate 430 also combines with the "one" signal on "carry" lead 356 from position $N-1$ to permit control AND gate 475 to provide a "one" signal to a $+R_N$ section of analogue converter 500. Each of the $+R_O$ and $+R_N$ sections will impart a unit binary weighting to "one" signals received thereat, so that in this instance, two $+1$ signals are transmitted over positive output lead 501.

Summarizing the operation, the "one" digit match in position A forced a mismatch in position B, which in turn provided two positive "carries" to control outputs in less significant digit positions. The control circuitry in position $N-1$ utilized one of these "carries" to provide a single weighted positive output of $+2$ and continued both positive "carries" to position N. Position N utilized one positive "carry" to provide two binary weighted positive outputs of $+1$. The positive "carry" was also utilized in position N to inhibit negative "carries" which otherwise would have been started in that position. Positive output lead 501 thus received a $+2$ output from position $N-1$ and two $+1$ outputs from position N, which combined to form the desired $+4$ final resultant.

It may be seen, therefore, that the most significant digit mismatch determines the sign of the final resultant. A mismatch of one polarity causes two "carry" signals of that polarity to control the outputs in that polarity from less significant digit positions. One of the "carries" also inhibits "carries" of the opposite polarity in less significant digit positions which may be started by mismatches of the opposite polarity in such positions. Thus four "carries" are indicated for each digit position which control four distinct outputs from each position of weighting corresponding to the binary weighting of the respective positions plus an additional output in each polarity of unit binary weighting. The various active "carries" combine with the comparison resultant for each position to determine which of the position outputs will be activated.

The rules governing operation of the circuit may be summarized as follows:

(1) If both position inputs are "zero" produce no comparison resultants and produce no "carries" for that digit position.

(2) If the conventional binary code input digit is a "zero" and the reflected binary code input digit is a "one," start two "carries" of one polarity in that position. All outputs of that polarity in less significant digit positions will be energized so long as all less significant digits are "zero." A less significant conventional binary code digit "one" inhibits one output in its position. A less significant reflected binary code digit "one" stops one of the "carry" signals in that position, thereby preventing one output in that and all less significant digit positions. This "carry" will be restarted by the appearance of another reflected binary code digit "one" in a less significant digit position.

(3) If the conventional binary code input digit is a "one" and the reflected binary code input digit is a "zero," two "carries" of the opposite polarity will be started. All outputs in less significant digit positions of that polarity will be energized so long as all less significant conventional binary code digits are "one" and all less significant reflected binary code digits are "zero." The appearance of a conventional binary code digit "zero" in a less significant digit position will inhibit one output in that particular position. The appearance of a reflected binary code digit "one" in a less significant digit position will stop one "carry" and one output in that and all following less significant digit positions. Another reflected binary code digit "one" in a less significant digit position will restart the "carry" stopped by the appearance of the former reflected binary code digit "one" and permit outputs produced by that "carry" in less significant digit positions.

(4) If both input digits are "one" and a mismatch has not occurred in a more significant digit position, the sign of the difference is indeterminate. In this instance no outputs and no "carries" will be generated in that position and the reflected binary code input digit in the succeeding digit position is reversed.

The logic involved in the binary number comparison conducted in the circuit may be expressed in algebraic form, utilizing the terminology of Boolean algebra, as follows, the steps being numbered to correspond to the rules stated hereinbefore:

(1) If $b_1=0$, $g_1=0$

Produce no outputs and produce no "carries"

(2) If $b_1=0$, $g_1=1$

Start "carries" $c_1$ and $c_2$

Following "carry" $c_1=c_1g_n'+c_1'g_n$

Following "carry" $c_2=c_2$

Output $(+V_{n1})=c_1$

Output $(+V_{n2})=c_2b_n'$

An added 1 output appears at the end of the $c_2$ "carry."

(3) If $b_1=1$, $g_1=0$

Start "carries" $c_3$ and $c_4$

Following "carry" $c_3=c_3g_n'+c_3'g_n$

Following "carry" $c_4=c_4$

Output $(-V_{n1})=c_3$

Output $(-V_{n2})=c_4b_n$

An added 1 output appears at the end of the $c_4$ "carry."

(4) If $b_1=1$, $g_1=1$

Reverse the following reflected binary code input digit $(g_n)$ and apply the above rules in the digit comparison so created.

It is to be understood that the above-described arrangement is illustrative of the application of the principles of the invention. Numerous other arrangements may be devised by those skilled in the art without departing from the spirit and scope of the invention.

What is claimed is:

1. An electrical circuit for indicating the exact magnitude and sign of the difference between two binary code numbers comprising a distinct comparison circuit for each digit position in the binary code numbers, means for applying signals representative of digits in like ordered digit positions in said numbers to individual of said comparison circuits, said comparison circuits producing comparison resultant signals on distinct comparison circuit output leads, distinct output means corresponding to individual of said digit positions in the binary code numbers, and means for applying said comparison circuit resultant signals to said output means, said last-mentioned means comprising control means in each position other than the highest order digit position for connecting said comparison circuit output leads to said output means in the corresponding digit positions and more than two carry leads for applying said comparison circuit resultant signals to said control means in all lower ordered digit positions.

2. An electrical circuit in accordance with claim 1 wherein said carry leads comprise first and second pairs of carry leads connecting, respectively, first and second of said comparison circuit output leads for each position to said control means corresponding to all lower ordered digit positions.

3. An electrical circuit in accordance with claim 2 wherein said first and second pairs of carry leads comprise positive and negative carry leads respectively, and further comprising inhibit means connected between said pairs of carry leads in each digit position such that a signal on one of said pairs of carry leads inhibits transfer of said comparison resultant signals from a lower ordered digit comparison circuit to the other pair of carry leads.

4. An electrical circuit in accordance with claim 3 wherein said output means comprises positive and negative output terminals, weighting elements connected in pairs between said control means in each position and said positive and negative output terminals respectively, and means for selectively applying said comparison resultant signals from said comparison circuits through one or both of said weighting elements of a selected one of said pairs of weighting elements dependent on said digit comparisons.

5. An electrical circuit in accordance with claim 2 and further comprising inhibit means connected between said carry leads and said output means in each digit position such that a signal on one of said carry leads inhibits transfer of certain of said comparison resultant signals from a lower ordered digit comparison circuit to the associated output means.

6. An electrical circuit for comparing two binary code numbers comprising a plurality of comparison circuits each corresponding to a distinct digit position in the two numbers, means including a single input lead for each digit for applying digits in like ordered digit positions in said two numbers to individual of said comparison circuits, first and second outputs from each of said comparison circuits indicative of the relative magnitudes of each pair of compared digits, distinct positive and negative output means, control means corresponding to each digit position other than the highest order digit position for connecting said comparison circuits to said output means, a first pair of control leads for applying said first comparison output to said control means connected to said positive output means in all lower ordered digit positions and a second pair of control leads for applying said second comparison output to said control means connected to said negative output means in all lower ordered digit positions.

7. An electrical circuit in accordance with claim 6 wherein each of said positive and negative output means for each position comprises a pair of weighting elements and further comprising means for selectively applying signals through one or both weighting elements in a selected one of said pairs of positive and negative weighting elements in each position responsive to said comparison circuit outputs in conjunction with signals on said carry leads from higher ordered digit comparison circuits.

8. An electrical circuit in accordance with claim 7 further comprising a positive output terminal connected to said pairs of positive weighting elements and a negative output terminal connected to said pairs of negative weighting elements.

9. An electrical circuit for comparing a conventional binary code number with a reflected binary code number to determine the sign and exact magnitude of their difference comprising a plurality of comparison circuits each corresponding to a distinct digit position in the two numbers, means for applying digits of like order in said two binary code numbers to individual of said comparison circuits, said comparison circuits providing output signals on distinct output leads, control means connected to said comparison circuit output leads in each digit position other than the highest order digit position, means comprising pairs of carry leads for applying output signals from each comparison circuit to said control means corresponding to lower ordered digit positions, and output means connected to each of said control means.

10. An electrical circuit for comparing two binary code numbers comprising a plurality of comparison circuits each corresponding to a distinct digit position in the two numbers, a plurality of positive and negative output means for said digit positions, a first and a second pair of carry leads connecting each comparison circuit to comparison circuits receiving lower ordered digits, control signals on said carry leads together with the specific inputs at each digit position determining the appearance of outputs at each of said positive and negative output means but the last of said positive and negative output means, and means for causing an output to be applied to a selected one of said last positive and negative output means on occurrence of control signals on said carry leads.

11. An electrical circuit in accordance with claim 10 wherein said output means include weighting means, said last output means having unit weighting.

12. An electrical circuit in accordance with claim 11 wherein said comparison circuits include inhibit means connected between said carry leads of each pair of carry leads.

References Cited in the file of this patent

UNITED STATES PATENTS

| | | |
|---|---|---|
| 2,749,440 | Cartwright | June 5, 1956 |
| 2,803,401 | Nelson | Aug. 20, 1957 |
| 2,877,445 | Cheilik | Mar. 10, 1959 |

OTHER REFERENCES

Foss: The Use of a Reflected Code in Digital Control Systems, IRE Transactions, Electronic Computers, December 1954, pp. 1 to 6.